US000001055H

United States Statutory Invention Registration [19]

[11] Reg. Number: H1055

Kydonieus et al.

[43] Published: May 5, 1992

[54] THERMAL ENERGY COAGULATION AND WASHING OF LATEX PARTICLES

[75] Inventors: Nicholas Kydonieus, King of Prussia, Pa.; Jeffrey A. Hall; James D. Phillips, Jr., both of Benton, Ky.; John A. Sturm, Paducah, Ky.

[73] Assignee: Atochem North America, Inc., Philadelphia, Pa.

[21] Appl. No.: 530,146

[22] Filed: May 29, 1990

[51] Int. Cl.[5] ..... C08F 6/16

[52] U.S. Cl. ..... 528/499; 528/500

*Primary Examiner*—Robert L. Stoll
*Assistant Examiner*—Joseph D. Anthony
*Attorney, Agent, or Firm*—Seidel, Gonda, Lavorgna & Monaco

[57] ABSTRACT

Increased efficiency coagulation and washing of latex particles is achieved by coagulating the latex to form particle flocks by application of a combination of mechanical and thermal energy, with up to about 85% of the applied energy being thermal energy. The flocks are thereafter washed by passage in counter-current relationship with wash water. The invention is particularly useful in the coagulation of fluorocarbon latices generated by polymerization, particularly emulsion polymerization.

11 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMAL ENERGY COAGULATION AND WASHING OF LATEX PARTICLES

FIELD OF THE INVENTION

The invention relates to the coagulation and washing of hydrocarbon polymer particles, in particular the coagulation and washing of such particles formed by an emulsion polymerization process.

BACKGROUND OF THE INVENTION

Typical polymerization processes, and emulsion polymerization processes in particular, result in the formation of a suspension of particles or "latex", often in the presence of a surfactant. Subsequent processing of the latex, particularly washing, depends on first agglomerating the latex particles into particle flocks. The size of the flocks is in proportion to the nature of the polymer, and the degree of coagulation.

Latex coagulation has been performed in the past by subjecting the latex to severe mechanical sheer in specialized multistage coagulator equipment. The object of the imparted sheer is to increase the kinetic energy of the individual latex particles to a level such that, upon interparticle impact, the repulsive force exerted by the particles' surfactant coating is overcome, causing particle agglomeration. Particle agglomeration results in the formation of particle flocks consisting of hundreds or thousands of particles, depending on the nature of the polymer and the degree of coagulation. A satisfactory degree of coagulation in this context may be viewed as the formation of aerated flocks of sufficiently large size, such that the flocks may ascend a wash column with sufficient velocity to avoid column flooding at a given velocity of countercurrent wash water. Particle flocks may be washed in countercurrent wash columns to remove water soluble impurities, such as is disclosed in U.S. Pat. No. 4,128,517, for example.

The degree of coagulation achieved depends primarily on the amount of mechanical shear energy imparted to the polymer, per unit mass of polymer. The degree of coagulation further depends upon the nature of the polymer. For one class of polymers, the polyvinylidene fluoride homopolymers and copolymers, the energy input generally required for coagulation varies from about 0.05 to about 0.5 horsepower-hour per pound of polymer. The specific coagulation energy requirement of a given polymer resin appears to depend primarily on the polarity of the polymer, which interacts with surfactant which may remain in the latex from the emulsion polymerization process.

SUMMARY OF THE INVENTION

A method for coagulating and washing an aqueous polymer latex for removing water-soluble contaminants is provided. By agitation and heating, the latex is imparted with a combination of mechanical and thermal energy sufficient to result in coagulation. A portion of the imparted energy, up to about 85% thereof, preferably up to about 75%, comprises thermal energy. The coagulated latex is thereafter washed by passing it in counter-current relationship with wash water. The method is particularly useful for coagulating and washing fluorocarbon polymer latices, most particularly, latices of vinylidene fluoridebased polymers. According to one embodiment, thermal energy is applied to polymer latex particles by heating the latex to a temperature no higher than about 20° C. below the melting temperature of the polymer.

By "mechanical energy" is meant any form of energy, other than thermal energy, which when applied to latex particles, results in an increase in the particles' velocity.

By "thermal energy" is meant energy applied in the form of heat.

By "fluorocarbon polymer" is meant any of the organic polymers analogous to hydrocarbon polymers in which one or more hydrogen atoms on the monomer unit have been replaced by fluorine. The term is further defined to include not only true fluorocarbon polymers, that is, polymers consisting only of carbon, fluorine and hydrogen atoms, but also to include polymers that contain other atoms, e.g. chlorine, in addition to carbon and fluorine. Thus, the term "fluorocarbon polymer" as used herein includes, for example, polytetrafluoroethylene, polymers of chlorotrifluoroethylene, fluorinated ethylene-propylene polymers, polyvinylidene fluoride, polymers of hexafluoropropylene, and the like.

By "vinylidene fluoride-based polymer" as used herein is meant to include not only homopolymers of vinylidene fluoride, but also copolymers, including terpolymers, of vinylidene fluoride and monomers copolymerizable therewith, such as tetrafluoroethylene, hexafluoropropylene, vinyl fluoride, trifluoroethylene, and the like. Typical examples of such copolymers are vinylidene/tetrafluoroethylene copolymer and vinylidene/tetrafluoroethylene/hexafluoropropylene terpolymer.

DESCRIPTION OF THE FIGURE

The FIGURE is a flow diagram of a polymer latex finishing system for the practice of the invention.

DETAILED DESCRIPTION OF THE INVENTION

Figure 1:
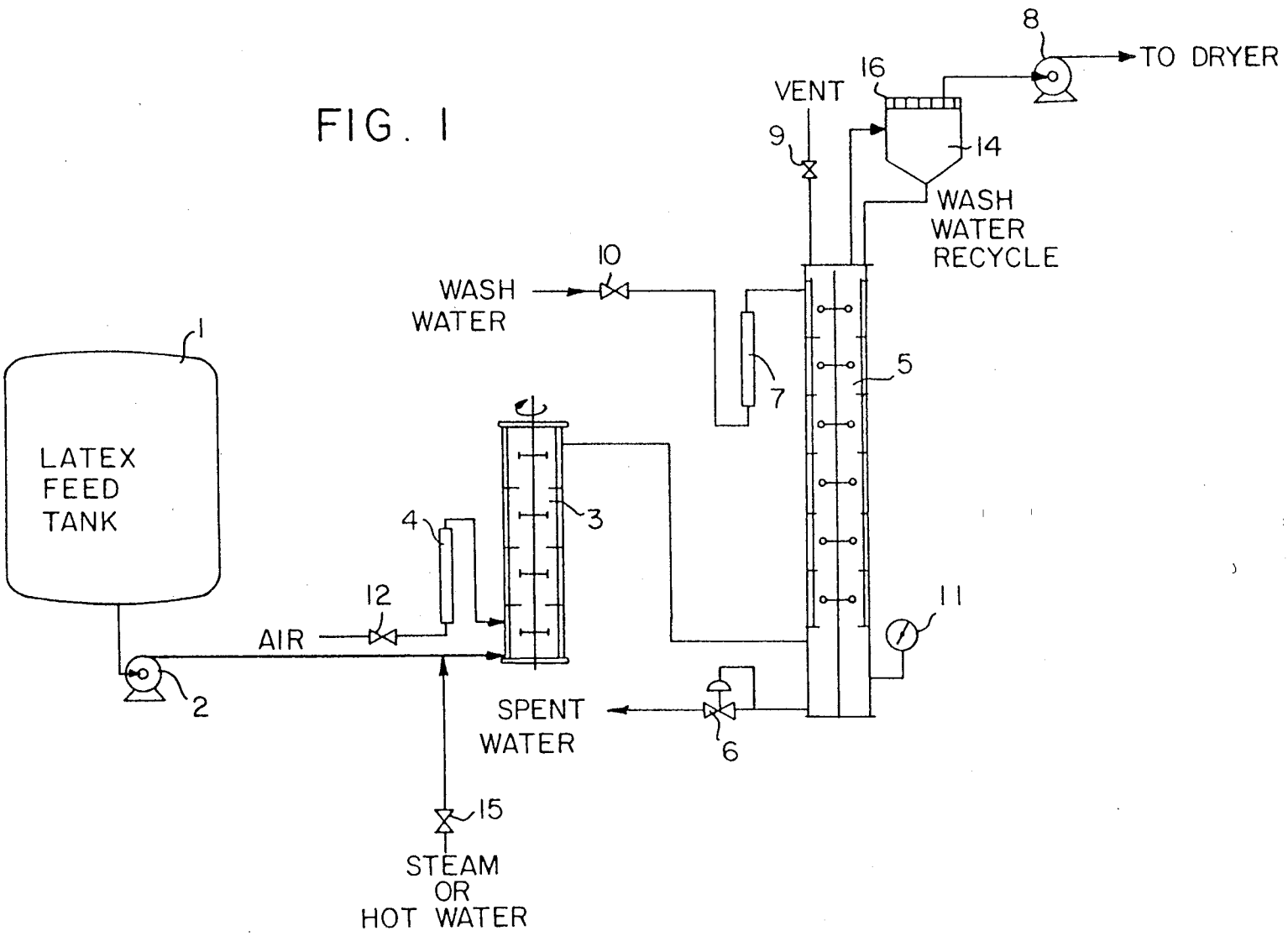

We have found that up to about 85% of the mechanical energy input which has heretofore been required for achieving coagulation of polymer latices may be advantageously replaced by thermal energy. Moreover, we have found surprisingly that by substituting a portion of the mechanical energy input with thermal energy, the overall energy input required for coagulation is reduced by as much as 30%, owing to an unexpected synergistic interaction between the applied mechanical and thermal energy.

The thus drastically reduced mechanical energy requirements for coagulation, i.e., up to about an 82% reduction, allows for substantial reduction in coagulator device size and/or coagulator agitation speeds. Coagulation maintenance costs are concomitantly reduced. Moreover, it may be appreciated that substituting thermal energy for a portion of the mechanical energy required for coagulation reduces energy costs. This is because the same amount of energy may be generated at lower cost by thermal means as opposed to mechanical means. The savings in energy cost is particularly significant in achieving coagulation of polymer particles which have high coagulation energy requirements, e.g., certain vinylidene fluoride-based homopolymers.

The present method for latex coagulation and washing may be utilized in any situation where the formation of particle flocks from latex particles is desired. The invention is particularly useful in the coagulation of polymer latices prior to washing in counter-current relationship with wash water to remove water-soluble contaminants from the latex.

The wash water is preferably pure deionized water, although the incorporation of cleaning or washing aids to the water may be practiced.

In addition to energy savings in the coagulation process, the practice of the invention results in an improvement in wash column performance. Washing of the particle flocks formed by latex coagulation may be accomplished by passing the preferably aerated flocks countercurrently through deionized water in a multistage countercurrent agitated conductor. The construction of such devices is known to those skilled in the art. When high was water velocities or insufficiently coagulated lattices are employed in these devices, the upward progress of the flocks through the wash column may be halted, resulting in column flooding and polymer loss in the spent wash water stream. When the latex is well-coagulated, as in the present invention, the particle flock size is very large, and the flock density is quite low. The column capacity and washing efficiency are effectively increased. As a result, the wash column may be operated at higher wash column velocities, permitting greater latitude in washing operations and essentially complete removal of water-soluble contaminants.

The increase in washing efficiency permits the production of ultrapure grades of polymer resin. Loss of polymer in the wash process, apparent as the formation of a haze in the wash water, is minimized or virtually eliminated. The haze is caused, to a large extent, by the incomplete flocculation of the latex particles in the coagulation process.

According to the invention, latex particles generated, for example, from an emulsion polymerization process, are collected for processing as an aqueous suspension. Examples of polymer suspensions formed by emulsion polymerization, which may be coagulated according to the present invention include, for example, polymers and copolymers of vinyl chloride, vinyl fluoride, vinyl acetate, styrene, alkyl acrylates, alkyl methacrylates, acrylonitrile, vinylidene chloride, vinylidene fluoride, ethylene, propylene, tetrafluoroethylene, isoprene, chloropropene, butadiene and the like. The invention is particularly useful in the coagulation of fluorocarbon polymer particles, and most particularly in the coagulation of vinylidene fluoride-based polymer particles. Generally, vinylidene fluoride-based polymers are prepared by polymerizing vinylidene fluoride monomers with or without copolymerizable comonomers in an aqueous medium containing a water-soluble surfactant, an organic peroxide initiator suitable for vinylidene fluoride polymerization, and optionally wax to stabilize the emulsion. Typical water-soluble fluorosurfactants for this purpose are taught, for instance, in U.S. Pat. Nos. 2,559,752, 2,239,970 or 4,360,652.

Following polymerization, the emulsion particles are generally still coated with the surfactant from the emulsion polymerization process. The surfactant coating is responsible for a particle-particle repulsion which may be overcome by increasing the kinetic energy content of the particles. Increasing the kinetic energy results in an increased number and velocity of particle collisions. When the collisions become sufficiently energetic to overcome the interparticle repulsive force, flocculation occurs.

The kinetic energy of the particles is increased according to the present invention by imparting a combination of mechanical and thermal energy to the particles. The total energy applied may comprise up to about 85% thermal energy, preferably up to about 75%, the balance comprising mechanical energy. In order to maximize the energy saving associated with the practice of the invention, at least about 50% of the applied energy should comprise thermal energy. The mechanical energy imparted to the particles may derive, for example, from a mechanical shear caused by a mechanical agitator, e.g., rotor, or by a hydraulic shear achieved by forcing the latex through a small orifice under pressure. Coagulation devices for generating such sheer forces are known to those skilled in the art.

The thermal energy may be imparted to the latex particles by any means which results in an increase in the heat content of the particles, i.e., by radiation, conduction, and/or convection. The thermal energy is most effectively imparted to the particles by treating the latex particles with steam or hot water as they enter the coagulation device. The steam or hot water treatment is conducted to an extent which will result in up to about 85% of the total energy increase imparted to the particles in the coagulator device being derived from the applied thermal energy. The actual level of thermal energy imparted to the particles, reflected in a temperature increase in the coagulation device above the temperature achieved without thermal energy input, will depend upon the nature of the polymer comprising the latex particle and the particular construction of the coagulator. For one type of vinylidene fluoride homopolymer having a specific coagulation energy requirement of 0.5 horsepower-hour per pound (hp-hr/lb) and a melting point of 170° C. as determined by differential scanning calorimetry, we have found that supplying sufficient thermal energy to maintain the latex particles at a temperature of at least about 175° F. (79.4° C.) will result in satisfactory coagulation. At this temperature, the mechanical energy otherwise required for substantially complete coagulation can be reduced dramatically, up to about 82%, without sacrificing subsequent washing efficiency.

The coagulation of the latex may be achieved with aeration as described in U.S. Pat. No. 4,128,517. Aeration before washing produces a foam wherein the suspended polymer particles have a reduced apparent density. The foamed product is then washed by passing it in countercurrent relationship with wash water.

The coagulator and washing components of a typical polymer finishing system, utilizing the present invention, is described in the FIGURE. The coagulation method of the invention may be advantageously utilized in conjunction with any counter-current polymer latex wash system, and particularly the wash system described in U.S. Pat. No. 4,128,517, the entire disclosure of which is incorporated herein by reference. The coagulated latex is passed in counter-current relationship upward through a column fed with wash water at the top. The washed product is continuously recovered.

According to the embodiment of the FIGURE, polymer latex is contained in feed tank 1. Prior to introduction of the latex into coagulator 3, wash water is allowed to enter wash column 5 through flow meter 7 by manipulating valve 10. Vent valve 9 is opened and column 5 allowed to fill with water; then the vent valve is closed. The column pressure will increase until back pressure valve 6 setting is reached, thereafter back pressure valve 6 will maintain column pressure by discharging sufficient water. At this point, latex pump 2 is started in order to introduce latex into the coagulator 3 at a predetermined rate, with a controlled amount of steam or hot water being fed through valve 15. The latex flow rate can be controlled with the pump speed. At the same time, valve 12 is opened sufficiently to allow air to enter coagulator 3 at a predetermined rate regulated by flowmeter 4.

The coagulator agitator is then started to coagulate and aerate the latex. The coagulated and aerated latex fills the coagulator 3 displacing the excess air from the coagulator 3 into the column 5. The excess air in column 5 is vented through vent valve 9. When the coagulated and aerated latex enters column 5 the column agitator is started. The coagulated latex froth ascends in column 5 coming into contact with wash water in a countercurrent fashion to rid the polymer particles of water soluble contaminants. The washed polymer reaches the top of column 5, where it forms a cake. The air feed to coagulator 3 and water feed to wash column 5 are monitored by meters 4 and 10, respectively. Wash column pressure is monitored by indicator 11.

The cake is piped to thickener 14, which functions as an inverse sedimentation tank, i.e., the polymer flock, due to its lower density, settles to the top of the tank, and the excess water is cycled to the wash column. A top rake 16 revolves at a low speed, e.g., 1 rpm, to eliminate cake "ratholing". Vertical fingers on the rake facilitate water drainage, increasing the latex concentration.

When the washed polymer cake reaches a desired size, discharge pump 8 is started at such a rate as to maintain the polymer cake size. The product of the system discharging through pump 8 may be sent to a dryer, and then to a packaging system.

Preferably, the column wash water is warmed to at least about 50° C., preferably from about 70° C. to about 80° C. we have found unexpectedly that a warm wash water contributes to the efficiency of the washing process, as evidenced by the clarity of the spent wash water. If the wash water is not heated, a slight haze may be apparent in the spent water.

Sufficient steam or hot water should be combined with the latex entering the coagulator through valve 15 such that the mechanical energy input to the latex required for successful coagulation (achieved by the mechanical shear exerted by the coagulator) may be reduced without sacrificing coagulator efficiency. The amount of thermal energy imparted to the polymer latex, reflected in the increase in the latex temperature, depends primarily on the nature of the polymer. The appropriate amount of thermal energy can be readily ascertained by those skilled in the art from the present disclosure and routine experimentation.

In order to avoid melting of the latex, the temperature of the latex in the coagulator preferably should not generally exceed a temperature which is about 20° C. below the polymer melting point, as determined by differential scanning calorimetry. The temperature of the coagulated latex at the coagulator output is thus advantageously continuously monitored by a coagulation temperature controller (not shown) which communicates with the hot water-/steam source supplying hot water or steam through valve 15. The temperature of the coagulator is controlled by manipulating the supply of steam or hot water.

The foregoing invention is further illustrated in the following non-limiting examples:

COMPARATIVE EXAMPLE 1

The wash column and thickener as described above were filled with deionized water. Vinylidene fluoride homopolymer was discharged from an aqueous reaction system as a 30% solids latex diluted with water to 15–20% solids (0.25–0.32 micron particle size), and piped to a coagulator substantially as described above. The latex contained other reaction ingredients, such as surfactant, buffer, catalyst fragments, and the like. The water-soluble contaminants are removed in the washing system. The coagulator, generally as shown in the FIGURE at 3, was equipped with high shear agitators capable of imparting shear energy to the process latex at a minimum rate of 0.05 horsepower per pound (hp/lb) of solids. The chambers of the coagulator were baffled to increase the power coupling between the agitators and the aerated latex. The coagulator had a length of approximately two feet and a diameter of about 12 inches, and was equipped with four agitation stages. The latex was fed through the coagulator at a rate of 25 pounds solids/hour. The latex was coagulated and aerated by agitation utilizing an agitation speed adjusted to afford the minimum specific mechanical energy input required for coagulation of the vinylidene fluoride homopolymer: 0.48 hp-hr/lb. The resulting coagulated, aerated latex was then fed to a fourteen-stage, 9-inch inside diameter counter-current wash column generally shown as 5 in the FIGURE. The latex was washed in counter-current fashion with deionized water to remove water-soluble contaminants. The flock rose to the top of the column and was transferred to a thickener of the type described above, designated as 14 in the FIGURE. The polymer flock was concentrated in the thickener and fed to a spray dryer. The spent wash water displayed a hazy appearance, indicating some polymer losses in the wash column, due to coagulation inefficiency in the coagulation stage.

EXAMPLE 1

The procedure of Comparative Example 1 was repeated except that steam was injected into the latex feed stream to the coagulator via valve 15 at the rate of 6 lb/hr, such that the discharge temperature of the coagulator was controlled at 175° F. (79.4° C.). Particle flocks having a density of between 0.2 and 0.6 g/cm$^3$ were obtained. The haze of the spent wash water from the wash column became clear within 15 minutes of operation. The agitator speed in the coagulator was then slowed so that the specific mechanical energy input was reduced from 0.48 to 0.14 hp-hr/lb. The steam injection rate increased to 4 lbs/hr, while the coagulator temperature controller maintained the coagulation temperature at 175° F. (79.4° C.), by manipulating the steam injection rate. The spent wash water maintained a clear appearance through this adjustment.

EXAMPLES 2–9

The feed rate of the material through the coagulator/wash system was increased gradually from the 25 lb/hr rate of Example 1 to determine the point at which the degree of latex coagulation was decreased sufficiently to result in hazing of the wash column spent water. The results are set forth in the Table. The feed rate was increased to the maximum capacity of the system feed pump of 48 lb/hr without hazing of the spent water at a steam feed rate of 27 lb/hr, which maintained the coagulator temperature at 175° F. (79.4° C.). See Example 9. The system was allowed to run at 48 lb/hr latex feed rate and 27 lb/hr steam injection rate for two hours, without hazing of the spent wash water.

TABLE

| Example | 2 | 3 | 4 | 5 | 6 | 7 | 8 | 9 | Comp. Ex. 1 |
|---|---|---|---|---|---|---|---|---|---|
| Solid Rate, lb/hr | 36 | 36 | 46 | 45 | 42 | 42 | 42 | 48 | 25 |
| Steam Rate, lb/hr | 16 | 19 | 28 | 31 | 33 | 38 | 33 | 27 | 0 |
| Coagulator Temp. °C. | 62.8 | 68.3 | 79.4 | 79.4 | 79.4 | 85 | 85 | 79.4 | — |
| Mech. Power, hp | 5.0 | 5.0 | 6.6 | 3.6 | 2.35 | 2.35 | 5.0 | 6.6 | 12.0 |
| Thermal Power, hp | 5.8 | 6.9 | 10.2 | 11.3 | 12.0 | 13.9 | 12.0 | 9.85 | 0 |
| Specific Mech. Energy, hp-hr/lb | 0.14 | 0.14 | 0.14 | 0.08 | 0.06 | 0.06 | 0.11 | 0.14 | 0.48 |
| Specific Thermal Energy, hp-hr/lb | 0.16 | 0.19 | 0.22 | 0.25 | 0.29 | 0.33 | 0.28 | 0.21 | 0 |
| Specific Total Energy, hp-hr/lb | 0.30 | 0.33 | 0.36 | 0.33 | 0.35 | 0.39 | 0.39 | 0.35 | 0.48 |
| % Mechanical Energy | 47 | 42 | 39 | 24 | 16.5 | 14.4 | 28 | 40 | 100 |
| % Thermal Energy | 53 | 58 | 61 | 76 | 83.5 | 85.6 | 72 | 60 | 0 |
| Spent $H_2O$ Appearance | Hazy | Clear | Clear | Hazy | Cloudy | Cloudy | Clear | Clear | Hazy |

It may be appreciated from a consideration of the Table that by substituting thermal energy for a portion of the mechanical energy input necessary for coagulation, the overall energy input required for coagulation may be reduced by as much as 30%.

The present invention may be embodied in other specific forms without departing from the spirit or essential attributes thereof and, accordingly, reference should be made to the appended claims, rather than to the foregoing specification, as indicating the scope of the invention.

We claim:

1. A method for coagulating and washing an aqueous polymer latex for removing water-soluble contaminants therefrom comprising:

agitating and heating the latex to impart a combination of mechanical and thermal energy thereto sufficient to result in coagulation of the latex, wherein up to about 85% of the imparted energy comprises thermal energy, and washing the coagulated latex by passing it in counter-current relationship with wash water.

2. A method according to claim 1 wherein up to about 75% of the energy imparted to the latex comprises thermal energy.

3. A method according to claim 2 wherein from about 50% to about 75% of the energy imparted to the latex comprises thermal energy.

4. A method according to claim 1 wherein the coagulated latex is passed in counter-current relationship with wash water by passing it continuously upward through a column fed with wash water at the top.

5. A method according to claim 1 wherein the polymer comprises a fluorocarbon polymer.

6. A method according to claim 5 wherein the polymer comprises a vinylidene fluoride-based polymer.

7. A method according to claim 6 wherein the vinylidene fluoride-based polymer comprises vinylidene fluoride homopolymer.

8. A method according to claim 1 wherein the latex is heated during coagulation by contact with hot water or steam.

9. A method according to claim 1 wherein the latex is heated during coagulation to a temperature no higher than about 20° C. below the melting point of the polymer.

10. A method according to claim 1 wherein the wash water is heated to a temperature of at least about 50° C. for washing the latex.

11. A method according to claim 10 wherein the wash water is heated to a temperature of from about 70° C. to about 80° C. for washing the latex.

* * * * *